United States Patent
Tsirkin et al.

(10) Patent No.: US 9,852,100 B2
(45) Date of Patent: Dec. 26, 2017

(54) GUEST-PROGRAMMABLE LOCATION OF ADVANCED CONFIGURATION AND POWER INTERFACE (ACPI) TABLES IN VIRTUALIZED SYSTEMS

(71) Applicant: Red Hat Israel, Ltd., Raanana (IL)

(72) Inventors: Michael Tsirkin, Yokeneam Yillit (IL); Gerd Hoffman, Feldberger Seenlandschaft (DE)

(73) Assignee: Red Hat Israel, Ltd., Raanana (IL)

( * ) Notice: Subject to any disclaimer, the term of this patent is extended or adjusted under 35 U.S.C. 154(b) by 157 days.

(21) Appl. No.: 14/191,226

(22) Filed: Feb. 26, 2014

(65) Prior Publication Data

US 2015/0242330 A1  Aug. 27, 2015

(51) Int. Cl.
  *G06F 13/42* (2006.01)
  *G06F 13/40* (2006.01)
  *G06F 12/02* (2006.01)
  *G06F 9/50* (2006.01)

(52) U.S. Cl.
  CPC .......... *G06F 13/4221* (2013.01); *G06F 9/50* (2013.01); *G06F 12/0284* (2013.01); *G06F 13/404* (2013.01); *G06F 2212/657* (2013.01)

(58) Field of Classification Search
  CPC .............. G06F 13/404; G06F 13/4221; G06F 2212/657; G06F 12/0284; G06F 9/50
  See application file for complete search history.

(56) References Cited

U.S. PATENT DOCUMENTS

| 6,594,751 | B1* | 7/2003 | Leivent ............... G06F 12/0866 711/118 |
| 7,478,178 | B2 | 1/2009 | Torudbakken et al. |
| 8,185,766 | B2 | 5/2012 | Barde |
| 8,321,931 | B2 | 11/2012 | Zimmer et al. |
| 8,386,745 | B2 | 2/2013 | Kegel et al. |
| 8,490,089 | B2 | 7/2013 | Friebel et al. |
| 9,317,452 | B1* | 4/2016 | Forschmiedt ....... G06F 12/1458 |
| 2006/0184480 | A1* | 8/2006 | Ayyar ................. G06F 13/4081 706/45 |
| 2006/0282651 | A1* | 12/2006 | Hobson ................ G06F 9/4411 713/1 |

(Continued)

OTHER PUBLICATIONS

Wojtczuk, Rafal et al., "Another Way to Circumvent Intel Trusted Execution Technology", Invisible Things Lab, pp. 1-8 (Dec. 2009).

(Continued)

*Primary Examiner* — Eric Oberly
(74) *Attorney, Agent, or Firm* — Womble Bond Dickinson (US) LLP (57) ABSTRACT

A system and method are disclosed for guest-programmable relocation of system tables in a virtualized computer system. In accordance with one embodiment, a hypervisor that is executed by a computer system obtains a first base address of a first portion of memory, where the first base address is in an address space of a guest of a virtual machine, and where the first base address is for a set of one or more system tables that is currently exposed by the hypervisor at a second portion of memory having a second base address in the address space of the guest. The hypervisor then generates a new version of the set of one or more system tables that is exposed to the guest at the first base address.

19 Claims, 4 Drawing Sheets

(56) References Cited

U.S. PATENT DOCUMENTS

| | | | | |
|---|---|---|---|---|
| 2007/0288718 A1* | 12/2007 | Cholleti | ............. | G06F 12/0223 |
| | | | | 711/170 |
| 2008/0005297 A1* | 1/2008 | Kjos | ................. | G06F 12/1081 |
| | | | | 709/223 |
| 2008/0162873 A1 | 7/2008 | Zimmer et al. | | |
| 2010/0262722 A1* | 10/2010 | Vauthier | .................. | G06F 3/14 |
| | | | | 710/8 |
| 2011/0173370 A1* | 7/2011 | Jacobs | ............... | G06F 12/1009 |
| | | | | 711/6 |
| 2013/0263114 A1 | 10/2013 | Watkins et al. | | |
| 2014/0059160 A1* | 2/2014 | Chernoff | ................ | H04L 49/70 |
| | | | | 709/217 |

OTHER PUBLICATIONS

Humbel, Lukas, "Multicore Virtualization over a Multikernel", Systems Group, Department of Computer Science, ETH Zurich, pp. 1-49 ( May 5, 2013).

Hanel, Lukas, "Systematic Setup of Compartmentalised Systems on the seL4 Microkernel", Institute for Systems Architecture, pp. 1-86 (Feb. 26, 2010).

* cited by examiner

GUEST-PROGRAMMABLE LOCATION OF ADVANCED CONFIGURATION AND POWER INTERFACE (ACPI) TABLES IN VIRTUALIZED SYSTEMS

TECHNICAL FIELD

This disclosure relates to computer systems, and more particularly, to virtualized computer systems.

BACKGROUND

An operating system (OS) is a set of programs that manage computer hardware resources and provide common services for application software. For hardware functions such as input and output and memory allocation, the operating system typically acts as an intermediary between application programs and hardware. Operating systems may be found on a variety of devices, including desktop computers, servers, smartphones, video game consoles, and so forth.

The Advanced Configuration and Power Interface (ACPI) specification provides an open standard for device configuration and power management by the operating system. The ACPI specification defines four global "Gx" states G0 through G3, six sleep "Sx" states S0 through S5, four device states D0 through D3, four processor states C0 through C3, and up to 17 implementation-dependent power-performance states P0 through Pn, where n is an integer between 1 and 16 inclusive. In addition, ACPI defines several tables that provide an interface between an ACPI-compliant operating system and system firmware, including a Differentiated System Description Table (DSDT), a Secondary System Description Table (SSDT), and a System Resource Affinity Table (SRAT).

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Described herein is a system and method for guest-programmable relocation of Advanced Configuration and Power Interface (ACPI) tables in virtualized computer systems. In one embodiment, a hypervisor that is executed by a computer system obtains a new base address for the ACPI tables, where the new base address is in an address space of a guest of a virtual machine (e.g., a guest operating system [OS] of the virtual machine, a guest basic input/output system [BIOS] of the virtual machine, etc.), and where the ACPI tables are currently exposed to the guest by the hypervisor at an old base address in the address space of the guest. The hypervisor then generates a new version of the ACPI tables that is exposed to the guest at the new address.

In one example, each entry of the new version of the ACPI tables is the same as the corresponding entry of the original ACPI tables when the corresponding entry is not a pointer to another entry of the ACPI tables. When the corresponding entry of the original ACPI tables is in fact a pointer to another entry of the original ACPI tables, the entry of the new version is set to the address of this pointer minus the old base address, plus the new base address. In this way, the entry is updated in the new version so that it continues pointing to the other entry, rather than to the old location at which this other entry was stored in the original ACPI tables. For example, suppose that the original set of ACPI tables has a base address of 1000, and that the new base address is 5000. Then if an entry of the original ACPI tables is a pointer to another entry of the original ACPI tables having, say, address 1035, then the corresponding entry of the new version will be a pointer to the table entry at address 5035.

In accordance with one example, the guest determines that the ACPI tables are to be relocated to the new base address (e.g., as part of a re-organization of guest memory, etc.) and notifies the hypervisor by writing the new base address to a particular register that is protected by the hypervisor (e.g., a Peripheral Component Interconnect [PCI] base address register [BAR], a configuration register of a PCI device, etc.). In one such example, this register may be specified by the ACPI tables.

In one embodiment, upon detecting that the register has been written to by the guest, the hypervisor obtains the new base address by reading the register's contents. The hypervisor then generates a new version of the ACPI tables and exposes this new version to the guest at the new base address.

In one embodiment, the new version of the ACPI tables is stored at a base address B that is in an address space of the hypervisor. Thereafter, when the guest queries the new version of the ACPI tables via a memory access of the form [new base address+offset], the hypervisor maps this memory access to the address [B+offset] where the corresponding table entry is stored.

Embodiments of the present disclosure thus enable virtualized systems to provide ACPI tables at guest-programmable addresses, rather than at a fixed address determined by the hypervisor. This capability allows ACPI tables to be dynamically relocated, while maintaining the correctness of self-referencing pointers, without requiring restarting of virtual machines. Moreover, in systems running multiple virtual machines with respective guests, each guest can individually manage its view of the system's ACPI tables in whatever fashion is best suited for that particular guest. It should be noted that while the present disclosure is described with respect to ACPI tables, embodiments of the present disclosure may also be employed for other types of operating system tables.

Figure 1:
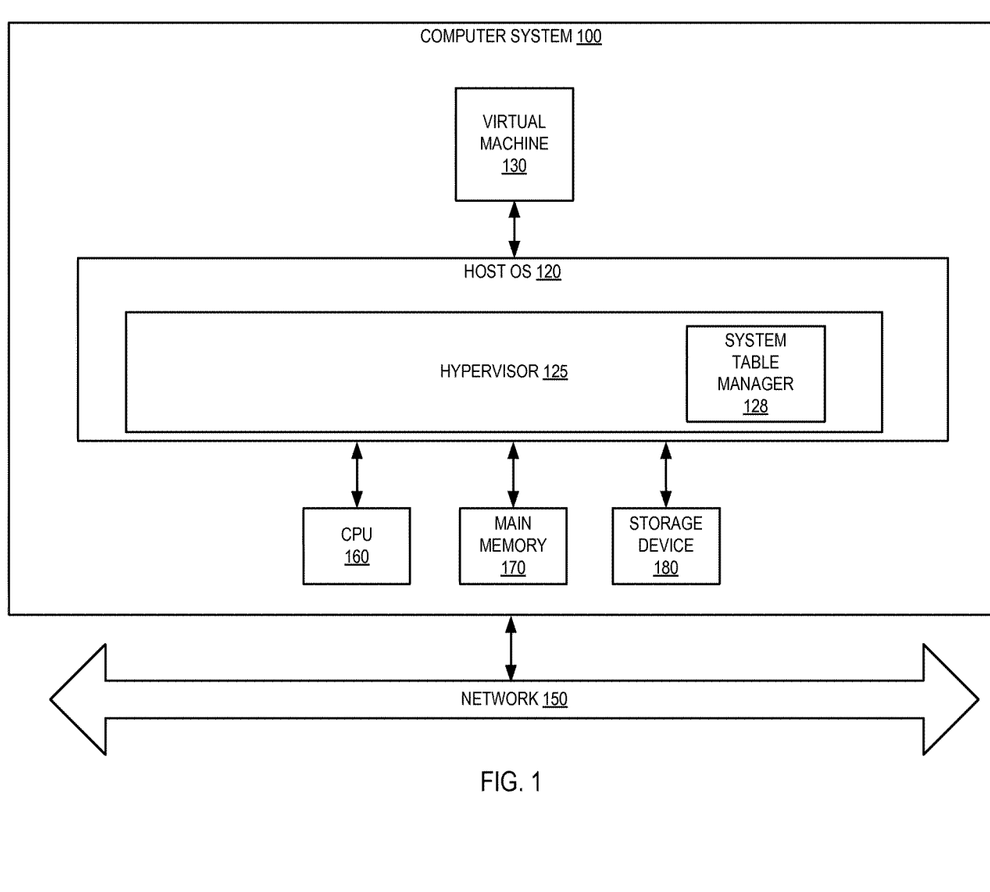
FIG. 1 depicts an illustrative computer system architecture, in accordance with an embodiment of the present disclosure.

FIG. 1 depicts an illustrative architecture of elements of a computer system 100, in accordance with an embodiment of the present disclosure. It should be noted that other architectures for computer system 100 are possible, and that the implementation of a computer system utilizing embodiments of the disclosure are not necessarily limited to the specific architecture depicted by FIG. 1.

As shown in FIG. 1, the computer system 100 is connected to a network 150 and comprises central processing units (CPU) 160, main memory 170, which may include volatile memory devices (e.g., random access memory (RAM)), non-volatile memory devices (e.g., flash memory), and/or other types of memory devices, and storage device 180 (e.g., a magnetic hard disk, a Universal Serial Bus [USB] solid state drive, a Redundant Array of Independent Disks [RAID] system, a network attached storage [NAS] array, etc.), connected by a bus 190 (e.g., a Peripheral Component Interconnect [PCI] bus, a Universal Serial Bus [USB}, etc.). The computer system 100 may be a server, a mainframe, a workstation, a personal computer (PC), a mobile phone, a palm-sized computing device, etc. The network 150 may be a private network (e.g., a local area network (LAN), a wide area network (WAN), intranet, etc.) or a public network (e.g., the Internet).

It should be noted that although, for simplicity, a single CPU is depicted in FIG. 1, in some other embodiments computer system 100 may comprise a plurality of CPUs. Similarly, in some other embodiments computer system 100 may comprise a plurality of storage devices 180, rather than a single storage device 180.

Computer system 100 runs a host operating system (OS) 120 that manages the hardware resources of the computer system and that provides functions such as interprocess communication, scheduling, virtual memory management, and so forth. In some examples, host operating system 120 also comprises a hypervisor 125, which provides a virtual operating platform for virtual machine 130 and that manages its execution. Virtual machine 130 is a software implementation of a machine that executes programs as though it were an actual physical machine, and that includes a guest operating system (OS) that manages the execution of these programs, and/or a guest basic input/output system (BIOS) that serves as an interface to firmware. It should be noted that although, for simplicity, a single virtual machine is depicted in FIG. 1, in some other embodiments computer system 100 may host a plurality of virtual machines.

In accordance with one example, hypervisor 125 may include a system table manager 128 that is capable of obtaining a target base address for ACPI tables that are currently exposed to a guest at a source base address, of generating a new version of ACPI tables, of exposing the new version of the ACPI tables to the guest at the target base address, and of handling memory accesses by the guest addressing the new version of the ACPI tables, as described below with respect to FIGS. 2 and 3. It should be noted that in some other examples, hypervisor 125 may be external to host OS 120, rather than embedded within host OS 120.

Figure 2:
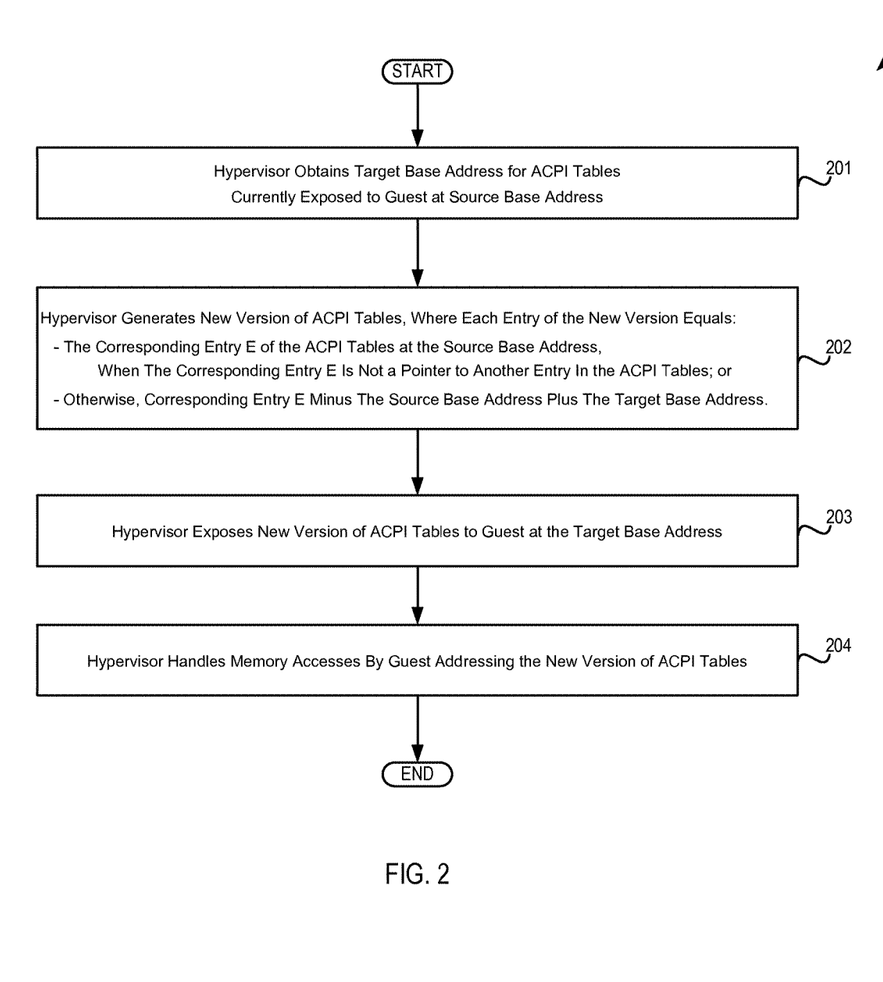
FIG. 2 depicts a flow diagram of one embodiment of a method by which a hypervisor detects and processes a guest request to relocate ACPI tables.

FIG. 2 depicts a flow diagram of one embodiment of a method 200 by which a hypervisor detects and processes a guest request to relocate ACPI tables. The method is performed by processing logic that may comprise hardware (circuitry, dedicated logic, etc.), software (such as is run on a general purpose computer system or a dedicated machine), or a combination of both. In one embodiment, the method is performed by the computer system 100 of FIG. 1, and more particularly, by hypervisor 125, while in some other embodiments, some or all of the method might be performed by another machine. In one embodiment, the ACPI tables are exposed to guests in an area of memory 170 that is read-only for guests (e.g., for a guest OS of VM 130, for a guest BIOS of VM 130, etc.). It should be noted that in some embodiments blocks depicted in FIG. 2 may be performed simultaneously or in a different order than that depicted.

At block 201, hypervisor 125 obtains a target base address for ACPI tables currently exposed to the guest at a source base address. In one example, the target base address is written by the guest to a register protected by hypervisor 125 (e.g., a Peripheral Component Interconnect [PCI] base address register [BAR], a configuration register of a PCI device, etc.) as a signal to the hypervisor that the guest has requested relocation of the ACPI tables to the target base address. Hypervisor 125 then detects that the register has been written to by the guest, and reads the register to obtain the target base address. It should be noted that in some implementations, the register written to by the guest and read by the hypervisor may be specified by the ACPI tables.

Alternatively, in some other examples a different mechanism may be employed by which the guest notifies hypervisor 125 of the target base address (e.g., via a special message, etc.). It should be noted that in one embodiment, the target base address and the source bases address are addresses in an address space of the guest. It should further be noted that in one implementation, block 201, as well as subsequent blocks 202 through 204, are performed by system table manager 128 of hypervisor 125.

At block 202, hypervisor 125 generates a new version of the ACPI tables, where each entry of the new version equals:
  the corresponding entry E of the ACPI tables at the source base address, when the corresponding entry E is not a pointer to another entry in the ACPI tables; or
  otherwise, the corresponding entry E minus the source base address plus the target base address.

Thus, entries in the ACPI tables pointing to other entries in the ACPI tables are updated accordingly in the new version in view of the target base address at block 202, while all other entries in the ACPI tables remain unchanged.

At block 203, hypervisor 125 exposes the new version of the ACPI tables to the guest at the target base address. At block 204, hypervisor 125 handles one or more memory accesses by the guest addressing the new version of the ACPI tables. It should be noted that in some implementations, the new version of the ACPI tables may actually be stored at a base address that is different than the target base address (e.g., a base address in an address space of hypervisor 125, etc.), even though, as a result of the exposing by hypervisor 125 at block 203, it appears to the guest that the new version of the ACPI tables is stored at the target base address. An embodiment of a method for performing block 204 in accordance with such implementations is described in detail below with respect to FIG. 3.

Figure 3:
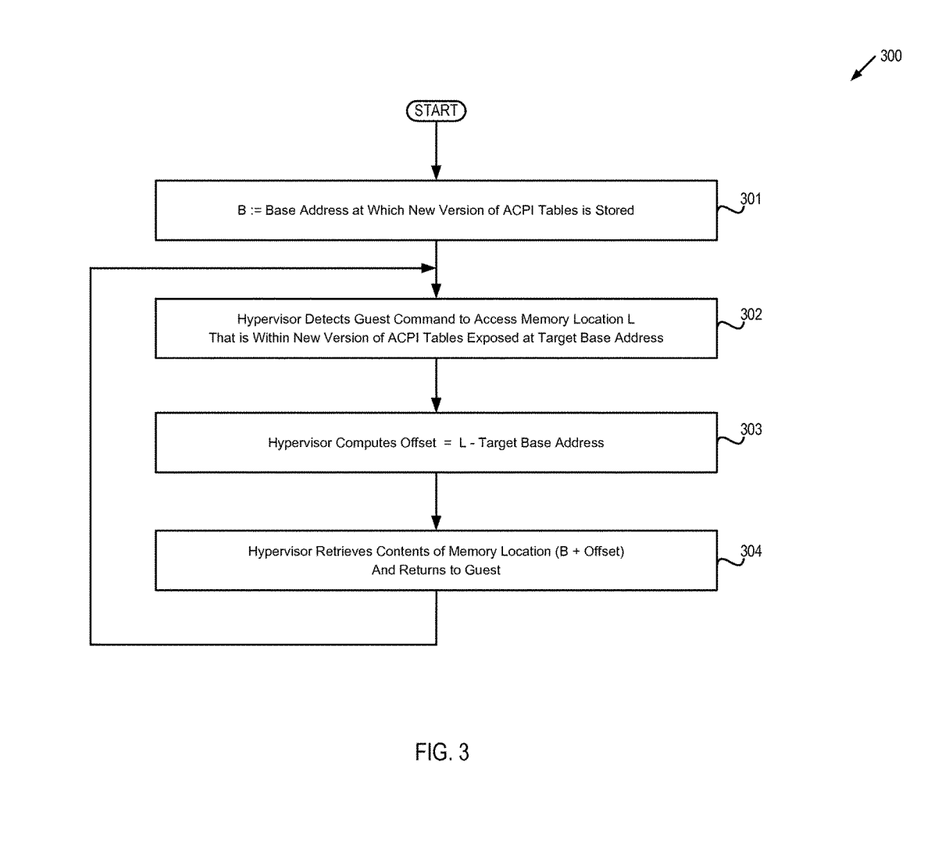
FIG. 3 depicts a flow diagram of one embodiment of a method by which a hypervisor handles guest accesses to relocated ACPI tables.

FIG. 3 depicts a flow diagram of one embodiment of a method 300 by which a hypervisor handles guest accesses to relocated ACPI tables. The method is performed by processing logic that may comprise hardware (circuitry, dedicated logic, etc.), software (such as is run on a general purpose computer system or a dedicated machine), or a combination of both. In one embodiment, the method is performed by the computer system 100 of FIG. 1, and more particularly, by hypervisor 125, while in some other embodiments, some or all of the method might be performed by another machine. In one embodiment, the ACPI tables are exposed to guests in an area of memory 170 that is read-only for guests (e.g., for a guest OS of VM 130, for a guest BIOS of VM 130, etc.). It should be noted that in some embodiments blocks depicted in FIG. 3 may be performed simultaneously or in a different order than that depicted.

At block 301, constant B is set to the base address at which the new version of the ACPI tables is stored. It should be noted that in one embodiment, the base address is an address in an address space of hypervisor 125. It should further be noted that in one implementation, block 301, as well as subsequent blocks 302 through 304, are performed by system table manager 128 of hypervisor 125.

At block 302, hypervisor 125 detects a guest command to access a memory location L that is in an address space of the guest and that is within the new version of the ACPI tables exposed at the target base address. In other words, memory location L is a location within [target base address, target base address+size(ACPI tables)].

At block 303, hypervior 125 computes the offset of memory location L with respect to the target base address: offset=L−target base address. At block 304, hypervior 125 retrieves the contents of memory location (B+offset) and returns it to the guest. After block 304, execution proceeds back to block 302 for the next guest command to access an entry of the new ACPI tables.

Figure 4:
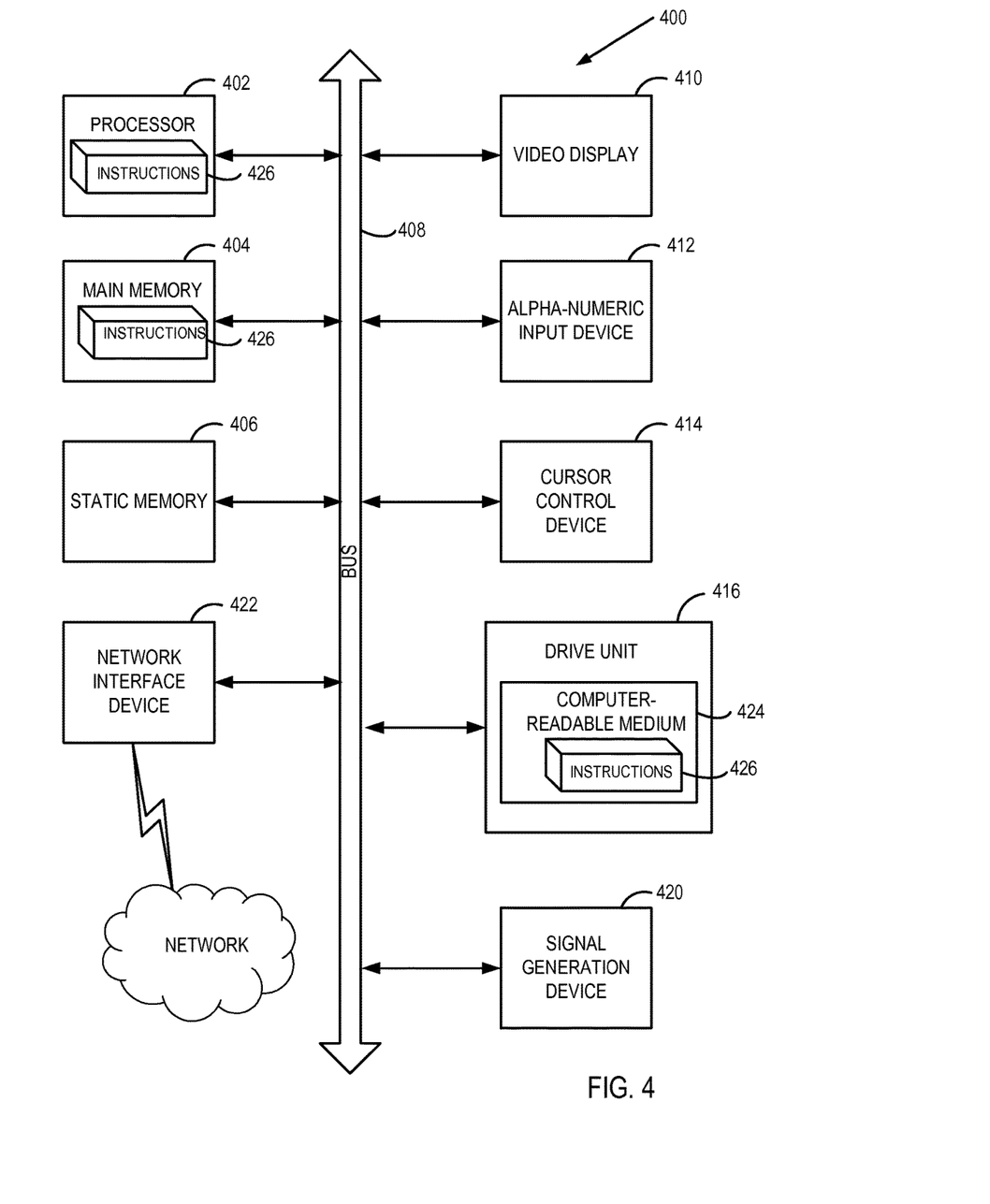
FIG. 4 depicts a block diagram of an illustrative computer system operating in accordance with embodiments of the disclosure.

FIG. 4 illustrates an illustrative computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The illustrative computer system 400 includes a processing system (processor) 402, a main memory 404 (e.g., read-only memory (ROM), flash memory, dynamic random access memory (DRAM) such as synchronous DRAM (SDRAM)), a static memory 406 (e.g., flash memory, static random access memory (SRAM)), and a data storage device 416, which communicate with each other via a bus 406.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions 426 for performing the operations and steps discussed herein.

The computer system 400 may further include a network interface device 422. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a computer-readable medium 424 on which is stored one or more sets of instructions 426 (e.g., instructions corresponding to the methods of FIGS. 2 and 3, etc.) embodying any one or more of the methodologies or functions described herein. Instructions 426 may also reside, completely or at least partially, within the main memory 404 and/or within the processor 402 during execution thereof by the computer system 400, the main memory 404 and the processor 402 also constituting computer-readable media. Instructions 426 may further be transmitted or received over a network via the network interface device 422.

While the computer-readable storage medium 424 is shown in an illustrative embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing description, numerous details have been set forth. It will be apparent, however, to one skilled in the art, that embodiments of the present disclosure may be practiced without these specific details. In some instances, well-known structures and devices are shown in block diagram form, rather than in detail, in order to avoid obscuring the present disclosure.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the foregoing discussion, it is appreciated that throughout the description, discussions utilizing terms such as "executing", "generating", "obtaining", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. In addition, embodiments of the present disclosure are not described with reference to any particular programming language. It will be appreciated that a variety of programming languages may be used to implement the teachings of the disclosure as described herein.

Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus. Embodiments of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
    detecting, by a processing device executing a hypervisor, that a hardware register protected by the hypervisor has been written to by a guest of a virtual machine;
    reading, by the hypervisor, in response to the detecting, a value stored in the hardware register by the guest, wherein the value is a first base address of a first portion of memory in an address space of the guest, the first base address for exposing a second system table to the guest, the second system table to be a new version of a first system table exposed by the hypervisor to the guest at a second portion of memory, and wherein the second portion of memory has a second base address in the address space of the guest;
    generating, by the hypervisor, after the reading of the hardware register, the second system table; and
    populating, by the processing device, an entry of the second system table in view of an entry of the first system table, wherein the populating comprises:
        in response to determining that the entry of the first system table is not a pointer to a first address in the address space of the guest corresponding to another entry in the first system table, setting the entry of the second system table to the entry of the first system table; and
        in response to determining that the entry of the first system table is a pointer to a second address in the address space of the guest that corresponds to another entry in the first system table, setting the entry of the second system table to a pointer that points to a third address in the address space of the guest that is different than the second address.

2. The method of claim 1 wherein the second system table is stored at a third base address that is in an address space of the hypervisor, and wherein a memory access by the guest addressing the first base address plus an offset are mapped by the hypervisor to the third base address plus the offset.

3. The method of claim 1 further comprising:
    performing a lookup of the second system table; and
    transmitting a signal to a hardware component in view of the lookup of the second system table.

4. The method of claim 3 wherein the transmitting of the signal is to configure the hardware component.

5. The method of claim 1 wherein the register is a Peripheral Component Interconnect (PCI) base address register (BAR).

6. The method of claim 1 wherein the register is a configuration register of a PCI device.

7. The method of claim 1 wherein the register is specified by the first system table.

8. A computer system comprising:
    a memory to store a virtual machine; and
    a processing device, operatively coupled to the memory, to:
        execute a hypervisor;
        receive, from a guest of a virtual machine, via the hypervisor, a message that specifies a first base address of a first portion of memory in an address space of the guest, the first base address for exposing a second system table to the guest, the second system table to be a new version of a first system table that is exposed by the hypervisor to the guest at a second portion of memory, and wherein the second portion of memory has a second base address in the address space of the guest;
        generate, via the hypervisor, after the receiving of the message, the second system table; and
        populate, via the hypervisor, an entry of the second system table in view of an entry of the first system table, wherein to populate the entry of the second system table comprises:
            in response to determining that the entry of the first system table is not a pointer to a first address in the address space of the guest corresponding to another entry in the first system table, setting the entry of the second system table to the entry of the first system table; and
            in response to determining that the entry of the first system table is a pointer to a second address in the address space of the guest that corresponds to another entry in the first system table, setting the entry of the second system table to a pointer that points to a third address in the address space of the guest that is different than the second address.

9. The computer system of claim 8 wherein the second system table is stored at a third base address that is in an address space of the hypervisor, and wherein a memory access by the guest addressing the first base address plus an offset are mapped by the hypervisor to the third base address plus the offset.

10. The computer system of claim 8 wherein the processing device is further to:
    perform a lookup of the second system table; and
    transmit a signal to a hardware component in view of the lookup of the second system table.

11. The computer system of claim 10 wherein the transmitting of the signal is to configure the hardware component.

12. The computer system of claim 10 wherein the transmitting of the signal is to set a power state of the hardware component.

13. The computer system of claim 10 wherein the transmitting of the signal is to examine a state of the hardware component.

14. A non-transitory computer readable storage medium, having instructions stored therein, which when executed, cause a processing device to execute a hypervisor to:
- detect, by the hypervisor, that a hardware register protected by the hypervisor has been written to by a guest of a virtual machine;
- read by the hypervisor, in response to the detection, a value stored in the hardware register by the guest, wherein the value is a first base address of a first portion of memory in an address space of the guest, the first base address for exposing a second system table to the guest, the second system table to be a new version of a first system table exposed by the hypervisor to the guest at a second portion of memory, and wherein the second portion of memory has a second base address in the address space of the guest
- generate by the hypervisor, after the reading of the hardware register, the second system table; and
- populate, by the hypervisor, an entry of the second system table in view of an entry of the first system table, wherein to populate the entry of the second table comprises:
  - in response to determining that the entry of the first system table is not a pointer to a first address in the address space of the guest corresponding to another entry in the first system table, setting the entry of the second system table to the entry of the first system table; and
  - in response to a determination that the entry of the first system table is a pointer to a second address in the address space of the guest that corresponds to another entry in the first system table, set the entry of the second system table to a pointer that points to a third address in the address space of the guest that is different than the second address.

15. The non-transitory computer readable storage medium of claim 14 wherein the second system table is stored at a third base address that is in an address space of the hypervisor, and wherein a memory access by the guest addressing the first base address plus an offset are mapped by the hypervisor to the third base address plus the offset.

16. The non-transitory computer readable storage medium of claim 14 wherein the instructions further cause the processing device to:
- perform a lookup of the second system table; and
- transmit a signal to a hardware component in view of the lookup of the second system table.

17. The non-transitory computer readable storage medium of claim 16 wherein the transmitting of the signal is to examine a state of the hardware component.

18. The non-transitory computer readable storage medium of claim 14 wherein the register is one of a Peripheral Component Interconnect (PCI) base address register (BAR) or a configuration register of a PCI device.

19. The non-transitory computer readable storage medium of claim 14 wherein the register is specified by the first system table.

* * * * *